Figure 3:
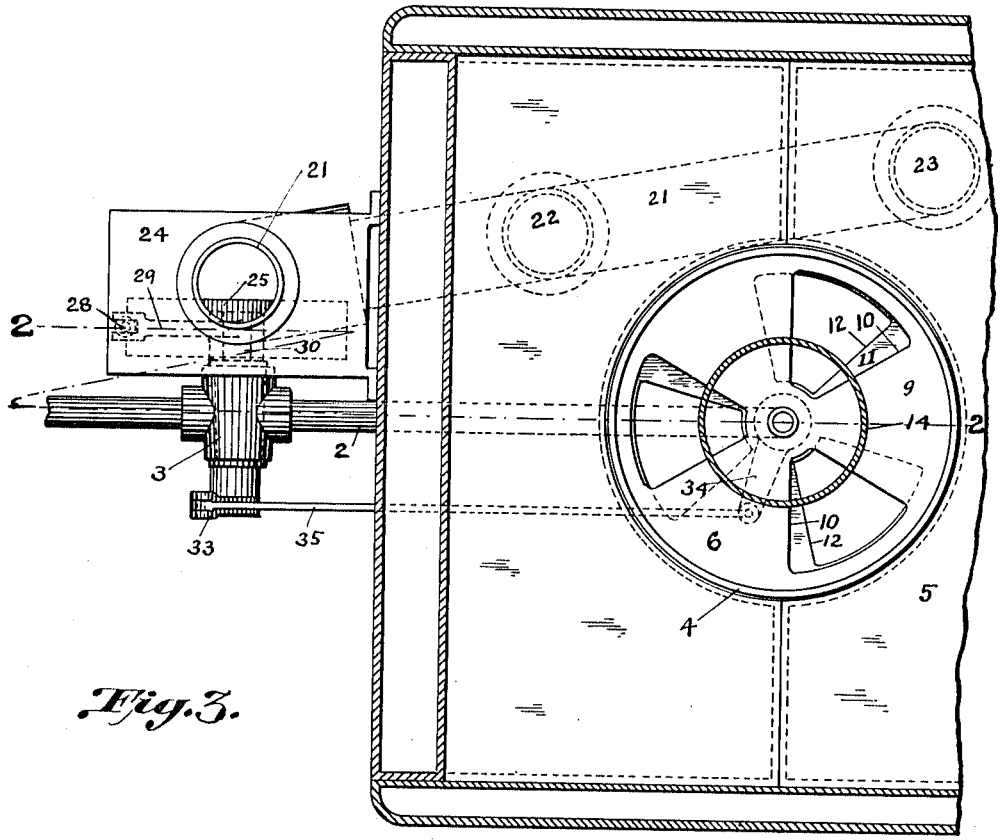

F. SCHULZ.
AUTOMATIC REGULATING DEVICE FOR HEATERS.
APPLICATION FILED MAR. 2, 1914.
1,270,877.
Patented July 2, 1918.
2 SHEETS—SHEET 1.
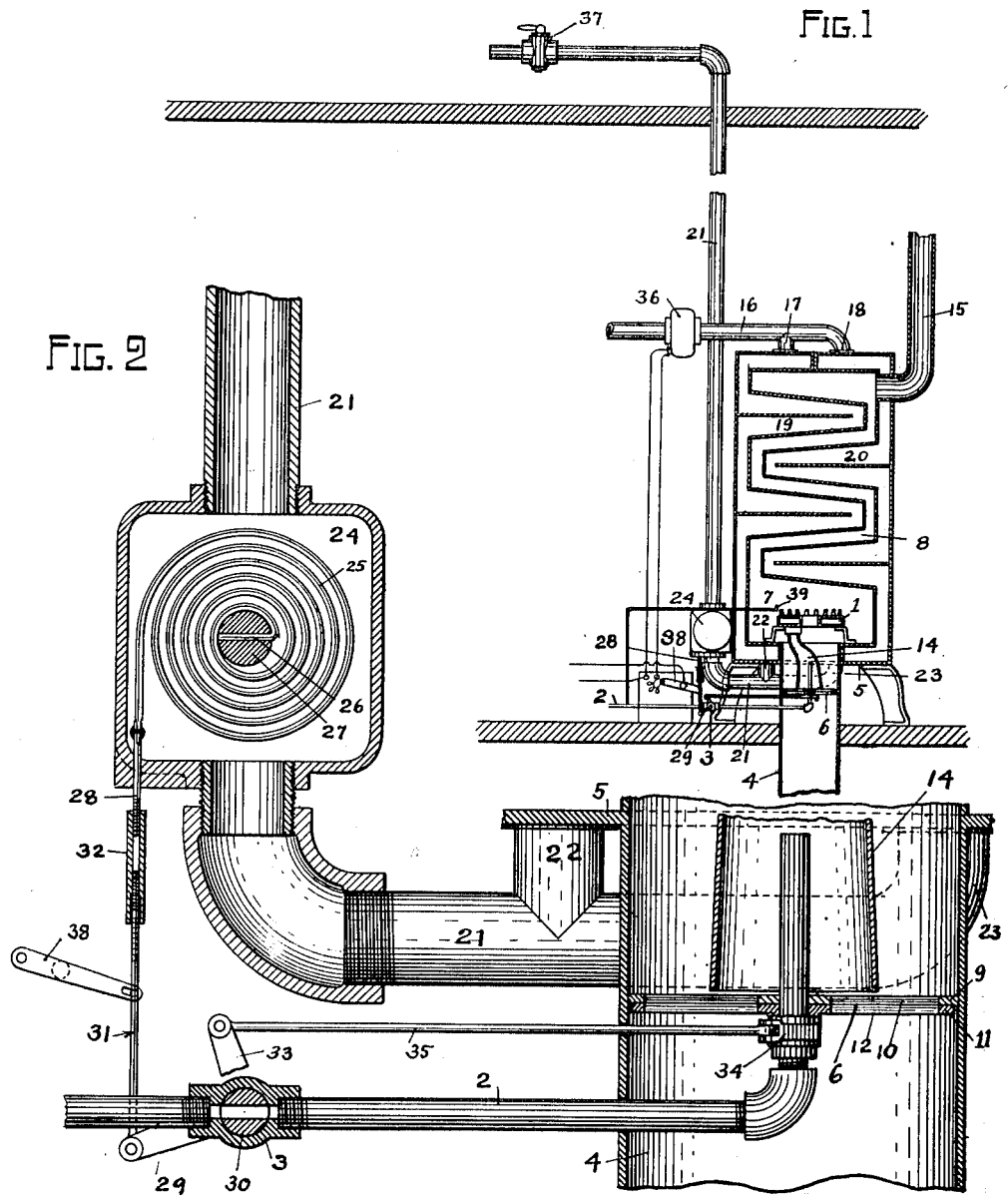
WITNESSES
INVENTOR
FRED SCHULZ
By Marcus J. Levé
ATTORNEY F. SCHULZ.
AUTOMATIC REGULATING DEVICE FOR HEATERS.
APPLICATION FILED MAR. 2, 1914.

1,270,877.

Patented July 2, 1918.
2 SHEETS—SHEET 2.

WITNESSES:

INVENTOR.
FRED SCHULZ
BY Marcus S. Levé
ATTORNEYS.

UNITED STATES PATENT OFFICE.

FRED SCHULZ, OF OAKLAND, CALIFORNIA.

AUTOMATIC REGULATING DEVICE FOR HEATERS.

1,270,877.  Specification of Letters Patent.  Patented July 2, 1918.

Application filed March 2, 1914. Serial No. 822,054.

*To all whom it may concern:*

Be it known that I, FRED SCHULZ, a citizen of the United States, residing at Oakland, in the county of Alameda and State of California, have invented new and useful Improvements in Automatic Regulating Devices for Heaters, of which the following is a specification.

My invention relates to improvements in automatic regulating devices to be used in connection with heaters, employed for the heating of water or air, and in which heaters the burning substance is a gas or a vaporous hydrocarbon; and it has the object to regulate the admittance into said heater of the gaseous fuel, and the admittance of air for combustion of the same in amounts varying with the quantity of the substance heated, preserving all the while the same relative proportion of fuel gas to air for the combustion of the same, thus making the heater rapid, and the economy of fuel high.

With this object in view the heater is provided with a pipe or conduit for the delivery of fuel gas, and a conduit for the delivery of air, for the combustion of said fuel, and valves are placed in said conduits to regulate said deliveries. Another conduit is provided for the discharge of the heated substance, and a thermostat is placed in said conduit, and is so connected to the aforesaid valves, as to actuate them, determining the degree of their opening by the degree of temperature inside the said conduit; opening them wider when the temperature of the thermostat falls, and diminishing the openings when the temperature rises.

In the drawings, forming part of this specification, Figure 1 is a sectional elevation of a heater for the heating of air, and provided with my automatic regulating device.

Figure 4:
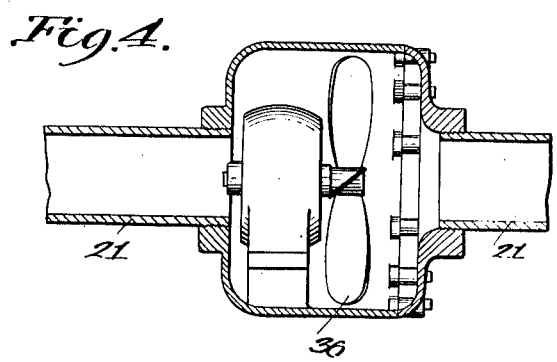

Fig. 2. is an enlarged sectional elevation through line 2—2 of Fig. 3, Fig. 3 is a sectional plan of a portion of a heater with my device attached; and Fig. 4 is an enlarged section through the fan casing and air delivery pipe.

1 represents a gas burner, of the kind ordinarily used in heaters. It is located in the interior of the heater, and is provided with a gas supply pipe 2, furnished with a gas supply valve 3. An air supply pipe 4 is connected to the bottom 5 of the heater. A valve 6 is placed inside said pipe 4, to regulate the delivery of air for the combustion of the fuel.

The gas supply pipe 2 passes through the wall of pipe 4 and leads to the center of the latter, where it is bent upward, and passing through the center of valve 6, extends above said valve for some distance.

The valve 6 consists of two circular plates 9 and 11. The plate 9 is made integral with the pipe 4, and is provided with ports 10, forming the valve seat, while the plate 11 is made to fit underneath said plate 9, and is adapted to turn around the vertical bend of the gas supply pipe 2. The plate 11 is also provided with ports 12, made to correspond with the ports 10 in the plate 9, when said plate 11 is turned in one direction, and to close said ports, when turned in the other direction.

Above the valve seat 9 a hood 14 covers the terminus of the gas supply pipe 2, the upper contracted end of which connects with the gas burner 1.

The gas, discharged at the end of pipe 2, becomes mixed with the air passing into the hood 14 through the ports 10 and 12 in valve 6, and is delivered through the contracted end of the hood 14 into said burner 1.

The mixture of gas and air, issuing through the tips of the burner, is further mixed with an additional supply of air, which passes through the ports 10 and 12, and enters the combustion chamber 7 of the heater through the space around the hood 14, thus bringing the proportion of air to fuel gas to the proper ratio required for perfect combustion.

The hot products of combustion are carried through the winding flue 8, and are discharged into the chimney 15.

The air to be heated is delivered by the air supply pipe 16, which connects with the two circulating passages 19 and 20 of the heater by the branches 17 and 18, and is discharged through the branches 22 and 23 into the discharge pipe 21.

A thermostat box 24 is placed in the discharge pipe 21. It contains in the interior the thermal element 25, which consists of two strips made of different metals, having a different coefficient of expansion by heat (like steel and brass). The strips are soldered together and are wound into a spiral; one end 26 of said spiral is fastened to a pin 27, held rigid in the wall of the thermostat box 24, while the other free end 28 is made to pass through the wall of said box, and to connect by means of the adjusting sleeve 32 and the rod 31 to the gas valve-operating lever 29, made fast to the valve plug 30.

The plug 30 of the gas valve 3 carries another lever 33, which connects by means of the rod 35 with an arm 34 on the movable plate 11 of the valve 6.

The air supply pipe 16 is provided with a fan 36, operated by a small electric motor. The object of said fan is to force a current of air through the circulating passages 19 and 20 of the heater, and from there discharge it into the discharge pipe 21, leading through the thermostat box 24 to the room or rooms to be heated. A valve or cock 37 is provided near the outlet of the pipe, to control the discharge of heated air into the room.

An electric switch 38 is placed in the circuit, leading to the motor, and is arranged to be operated by the thermostat in such a way, as to break the circuit, when the temperature rises above a certain predetermined point, and to close the circuit, when it falls below another predetermined point.

The operation of the heater, and the action of my device is as follows:—

The fuel gas is admitted through the valve 3, and carried through the gas pipe 2, to be discharged in the interior of the hood 14, where, as heretofore stated, it is mixed with a part of the air, delivered by the pipe 4 through the ports 10 and 12 of valve 6. From there the mixture of gas and air passes through the contracted end of the hood 14 into the burner 1, to be discharged thence through the burner tips into the combustion chamber 7, where, while burning, it receives an additional supply of air, which passed through the ports 10 and 12 of the valve 6 at the outside of the hood opening. The hot gases of combustion, while passing through the winding flue 8, to be discharged at last through the chimney 15, lose most of the heat, imparting it to the air in the circulating passages 19 and 20 of the heater.

The air to be heated is forced by the fan 36 through the supply pipe 16 and the branches 17 and 18 into the circulating passages 19 and 20, where it becomes highly heated, while winding through the long passages, and then it leaves the heater, and is carried by the pipe 21 through the thermostat box 24 and through the valve 37 into the room.

When the valve 37 is fully opened, the discharge of hot air into the room will be increased, and the circulation through the entire pipe line will increase. The air, while moving through the circulating passages 19 and 20, will be subjected for a shorter time to the action of the hot gases of combustion, passing through the flue 8, and will enter the discharge pipe 21, and the thermostat box 24 at a lower temperature than required. The spiral strips 25 of the thermostat will then coil up (due to the fall of temperature and the greater contraction of the inner brass strip above that of the outer steel strip), thus pushing on the rod 31, and opening wider the gas valve 3 and the air valve 6, raising the flame in the heater, and in this way elevate the temperature of the discharged heated air.

When the valve 37 is partly closed, the circulation through the heater will be diminished, and the air will pass through the thermostat 24 at a higher temperature, heating up the spiral strips 25, causing them to uncoil, and thus diminish the openings of the valve 3 and valve 6, lowering the flame of the burner, and thus lower the temperature of the discharged heated air.

The regulating device will thus control the size of the flame keeping it steady. The plug 30 of the gas supply valve 3, and the movable plate 11 of the air valve 6 will remain at rest during all the time, the flow of the heated air through the discharge pipe 21 remains constant; and will move, altering the size of openings, only at the instant, when the opening in the valve 37 is altered in order to increase or diminish the discharge of air into the room or rooms, thus subjecting the valves to a minimum amount of wear.

When the heater is not to be used for a considerable time, the supply of gas from the main is closed at the meter, and the supply of current to the electric motor is cut off; when, however, the heater is not used temporarily, the gas from the main and the electric current to the motor is left open, the regulating device will then control the heater with a trifle consumption of gas, as is evident from the following consideration.

When the valve 37 is entirely closed, there will be no circulation through the entire line of the air heating pipes, the air in the passages 19 and 20 will become highly heated and the spiral strips 25 in the thermostat will uncoil to a greater extent than before, closing entirely the gas valve 3, and the flame of the burner will become extinguished; at the same time the switch 38 will break the electric circuit, stopping the motor and fan 36.

The thermostat will then commence to cool, and when the temperature will become low enough, the spiral in the thermostat will again throw in the switch 38, and open the gas valve 3, admitting gas into the combustion chamber 7, to be again lighted by the pilot jet 39. If the valve 37 will still remain closed, the air in the heater and in the pipe line will soon again become heated high enough to close the gas valve 3, and stop the motor 36, and this process will be repeated at regular intervals, until the valve 37 will again be opened, establishing a circulation through the pipe line.

To regulate the temperature, at which the thermostat is to act, I connect the free end of the spiral strip 25 of the thermostat with the rod 31 by the adjusting sleeve 32, the inner bore of which is tapped with a right hand tap at one end and a left hand tap at the other. The free end of the thermostat spiral 25 and the end of the rod 31 are threaded correspondingly with opposite threads, and in this way the length of the connection between the end of the spiral and the pin in the valve operating lever 29 can be lengthened or shortened, the lengthening of said connection causing the valves 3 and 4 to operate at a higher temperature, while the shortening, at a lower.

Having thus described my invention, what I claim and desire to secure by Letters Patent, is:

1. An automatic regulating device for heaters, comprising a gas supply pipe, an inlet valve in said pipe, a pipe for the delivery of air for combustion, an air supply valve, a pipe for the delivery of the substance to be heated, a fan placed in said pipe, and adapted to force air through the same, an electric motor adapted to run said fan, an electric switch to control the current to said motor, a pipe for the discharge of the heated substance, a thermostat placed in said pipe and connected to said valves and to said switch, the connection to said valves being so arranged as to increase their openings when the temperature in said thermostat falls, and to diminish said openings when it rises; while the connection with said switch to be such as to close the circuit when the temperature falls to the lowest extreme, and to break the circuit when it rises to the other extreme of the predetermined range of temperatures.

2. An automatic regulating device for heaters, comprising a gas supply pipe and a gas supply valve, a pipe for the delivery of the substance to be heated, a fan and an electric motor for the circulation of said substance through the heater, a switch to control the electric current to said motor, a pipe for the discharge of the heated substance, a thermostat box located in said discharge pipe, a thermal member, comprising two strips of metal, soldered together, and wound into a spiral, located in the interior of said box, one end of said spiral being fastened to said box, while the other free end is connected to operate said valve and said switch.

FRED SCHULZ.

Witnesses:
G. A. PETERSON,
A. SHENSON.